United States Patent
O'Keeffe et al.

(10) Patent No.: US 7,564,962 B1
(45) Date of Patent: Jul. 21, 2009

(54) PROVIDING USER INFORMATION AND CONTROL OVER A CONTACT WITHIN A CONTACT CENTRE

(75) Inventors: Michael O'Keeffe, Galway (IE); Liam Loftus, Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 1068 days.

(21) Appl. No.: 10/741,519

(22) Filed: Dec. 19, 2003

(51) Int. Cl.
*H04M 3/51* (2006.01)

(52) U.S. Cl. ............................. 379/265.09; 379/88.17; 370/401; 705/50; 709/245

(58) Field of Classification Search .............. 379/88.17, 379/266.01, 265.09; 709/245, 204, 217, 709/219; 370/401; 705/50
See application file for complete search history.

(56) References Cited

U.S. PATENT DOCUMENTS

| | | | | |
|---|---|---|---|---|
| 6,574,331 B1 * | 6/2003 | Forsythe et al. | ........ | 379/265.01 |
| 6,603,854 B1 * | 8/2003 | Judkins et al. | ......... | 379/265.06 |
| 6,654,457 B1 * | 11/2003 | Beddus et al. | ......... | 379/265.02 |
| 6,654,815 B1 * | 11/2003 | Goss et al. | ................... | 709/248 |
| 6,687,745 B1 * | 2/2004 | Franco et al. | ............... | 709/219 |
| 6,760,750 B1 * | 7/2004 | Boneh et al. | ................ | 709/204 |
| 6,961,419 B2 * | 11/2005 | Power et al. | ........... | 379/265.09 |
| 6,988,126 B2 * | 1/2006 | Wilcock et al. | ............. | 709/204 |
| 7,043,009 B1 * | 5/2006 | Fischer et al. | .......... | 379/265.09 |
| 7,050,568 B2 * | 5/2006 | Brown et al. | ........... | 379/266.01 |
| 7,062,465 B1 * | 6/2006 | Shafiee et al. | ................. | 705/50 |
| 7,324,528 B2 * | 1/2008 | Szlam | ........................ | 370/401 |
| 2002/0038354 A1 * | 3/2002 | Ogasawara | .................. | 709/217 |
| 2003/0009592 A1 * | 1/2003 | Stahura | ...................... | 709/245 |

* cited by examiner

*Primary Examiner*—Gerald Gauthier
(74) *Attorney, Agent, or Firm*—Barnes & Thornburg LLP

(57) ABSTRACT

A contact relating to a communication being processed in a contact center (such as for example a voice call, video call or chat session) is allocated a unique identifier. A web page is accessible to the remote customer involved in the communication. On entering the unique identifier in the web page the user is provided with a customised page including information regarding the status of the contact (such as for example queue position, queue skillset, and expected wait time) and the user can select options in this page to influence the processing of the contact by the contact center, such as by switching queues, requesting a specific agent to handle the contact or terminating the contact and substituting an email or a callback request.

25 Claims, 3 Drawing Sheets

PROVIDING USER INFORMATION AND CONTROL OVER A CONTACT WITHIN A CONTACT CENTRE

TECHNICAL FIELD

This invention relates to the provision of information regarding the status of contacts within a contact centre and the provision of remote control over contacts to the users or customers of a contact centre.

BACKGROUND ART

Contact centres provide an interface between an organisation and users of that organisation, such as between a business and its customers. Contacts of various media types (such as telephone calls, chat sessions, instant messaging sessions, video calls or emails) can be initiated either by the user or by the contact centre, but are most commonly initiated by a user. In many cases a contact is queued until an agent having the required skillset to deal with the contact is free. During this time the call will be put on hold or the chat session will enter a wait mode, for example, or an email will simply be submitted to a contact's address and the user simply awaits a reply.

Certain contact centre systems can provide a user with feedback while they are holding for an agent. For example, a user hears a recorded message providing a status update, such as the position of the contact within a queue or the expected wait time until an agent will be free. Such information is necessarily limited, and the user has little control over the contact other than to hang up. Sometimes the user can also choose to leave a message before hanging up.

Alternative methods have been proposed to provide contact centre users with enhanced information and services. For example, U.S. patent application Ser. No. 09/572,384, filed May 16, 2000 (assigned to Nortel Networks Limited) discloses an interactive response system for use with display phones in which the user can select responses to prompts on a visual display (as an alternative to a standard interactive voice response mechanism), thereby assisting in more accurately queuing the contact.

A problem with current contact centre technology is that apart from information such as expected wait time or queue position (which is not always available), users or customers frequently find that their contact enters a hold or waiting state and if the contact is not dealt with speedily the user may lose patience and hang up or disconnect, in which case the contact is effectively dropped from the system.

Furthermore, it is a common occurrence that a user will previously have made contact with the contact centre and will wish to speak with the specific agent who handled the previous contact. In such cases, the user often has little option but to wait until the new contact reaches the top of the queue, and then asks for the particular agent who dealt with the previous contact. The user then has to hold again until that agent is free. While it is possible for an agent to provide a direct dial number for use in follow up contacts from a customer, such calls are usually routed direct to the agent and do not enter the reporting and statistics of the contact centre. The agent then appears to be idle or to be on a personal call when in fact he or she is dealing with a repeat customer, and the final resolution of the customer's query may not be reflected in the statistics for the contact centre.

DISCLOSURE OF THE INVENTION

The invention provides a method of providing remote control over a contact within a contact centre to a user associated with the contact. The method involves the steps of:

a) generating a web page which has information relating to the status of the contact, b) providing one or more user controls accessible from the web page, c) awaiting activation of at least one of the controls by the user, and d) on activation of one of the controls, generating a command to a contact management component of the contact centre, to change the status of the contact.

This method provides the user with the means to use the web to issue commands to a contact centre, and for these commands to influence an existing communication made between the user and the contact centre by another route. In other words, a caller who is on hold in a contact centre queue can access a web page provided for this purpose by the contact centre and request that the call be handled differently, such as to queue to a specific agent who the caller has dealt with before, or to leave a call back request in place of the queued call.

The user controls can be directly accessible in the web page or they can be provided on a linked page or in an application (such as a Java Applet) accessible from the page itself.

Preferably, the step of generating a web page is carried out in response to a request from a user, the request including an identifier provided to the user by the contact centre to identify the contact.

Thus, an email submitted to a contact centre might generate an automatic response including the ID number, and this ID number could then be used to check the status of the email in a queue, avoiding the possibility of the user submitting further emails simply to enquire of the status of the original query.

Preferably, the contact is associated with a real time communications session between the user and the contact centre, and the identifier is provided to the user as part of the communications session.

Thus, a caller connecting to a contact centre may hear a computer generated voice reciting the ID number associated with the call, and this can then be used to call up a customised web page allowing user control over the progress of the call in the contact centre while the call is actually in progress. Similar mechanisms could be used for chat sessions, instant messaging sessions or video calls.

The information supplied to the user may include one or more of:

i) an indication of a position of the contact in a queue, ii) an indication of the current expected wait time for an agent to respond to the contact, iii) an indication of the identity of an agent currently assigned to deal with the contact, iv) an indication of a skillset grouping according to which the contact is queued, and v) an indication of the media type of the contact.

In one example, the command is effective to switch the contact between queues in the contact centre.

This can involve switching between groups of agents or skillsets, or switching from a more general queue to a specific queue for an individual agent, for example.

In another scenario, the command is effective to terminate a communications session involving the contact and to provide a new communication to the contact centre from the user to the contact centre from the web page or a page linked to the web page.

This option is most likely to be selected when the user does not wish to wait in a queue and would prefer to submit a comment or query before hanging up, or would prefer to request a call back instead of waiting in the queue.

Suitably, the contact is associated with a real time communications session between the user and the contact centre, and the new communication is an email or form submission generated by the user from the web page or a page linked to the web page.

Examples of such real time communications sessions a voice telephony session, a video telephony session, a web chat session and an instant messaging session.

Telephony sessions (whether voice or video) are deemed to include conferences as well as one-to-one sessions. Similarly web chat and instant messaging sessions include multi-user sessions and chat room sessions.

In another option, as indicated above, the new communication can be a call-back request generated by the user from the web page or a page linked to the web page.

The method can involve the additional steps of:

e) receiving from the contact centre confirmation of the new status of the contact after execution of the command, and f) generating a new web page including information relating to the new status of the contact.

In this way, a user selecting the option to issue a command to influence the status of a contact can receive, in response to this submission, a real time update of the new status of the contact. Optionally, confirmation can be sent by the contact centre using the route by which the contact was originally established, e.g. by playing a message to the user over a voice call, or by issuing a further email confirming the change in status.

The invention also provides a computer program product comprising a computer readable medium encoded with instructions in machine readable form which implements this method in a web server having an interface with a contact centre.

The program can be pre-loaded on a web server, it can be supplied separately over the Internet (or some other data network), it can be supplied on magnetic or optical disc (or some other physical carrier), it can be implemented as an electronic circuit or on a chip within, or it can be implemented as a firmware upgrade to a server. Other methods of providing the computer program as a product will no doubt become apparent to the skilled person as technology progresses and the invention is not limited to any particular implementation.

The invention also provides a web server comprising:

a) an interface with a management system of a contact centre, b) a web page building engine for receiving information relating to the status of a contact within the contact centre associated with a user of the contact centre, and generating a web page including the information, c) a control interface for recognising the activation of one or more user controls accessible from the web page, and d) a command generator for generating a command to a management system of the contact centre on activation of one of the one or more user controls, the command being effective to influence the status of the contact within the contact centre.

The invention additionally encompasses a contact centre system comprising an interface for enabling a communications session to be initiated between a user and the contact centre, a management system for managing a contact generated in response to the initiation of the communications session, and a web server as aforesaid.

The invention further provides a web page comprising code which when interpreted in a client program is effective to provide to a user of the client program:

a) dynamically generated information relating to the status of a contact within a contact centre associated with the user, b) an indication of one or more status change options available for the contact within the contact centre, and c) one or more user controls accessible from the web page for activation by the user to select one or more of the status change options.

The information may include, for example:

an indication of a queue in which the contact is queued and the status change options include the option to switch the contact to at least one other alternative queue, or an indication of a queue position of the contact within a queue and the status change options include the option to terminate a communications session associated with the contact and to generate a substitute communication for queuing in the contact centre.

In another aspect the invention provides a method of providing information regarding a contact within a contact centre to a user associated with the contact. This method involves the steps of:

a) providing a web page accessible by the user to enable the user to identify the contact to a web server, b) receiving at the web server a communication from the user identifying the contact, c) forwarding information identifying the contact in an information request to a management system of the contact centre, d) receiving from the management system of the contact centre information regarding the status of the contact, and e) returning a web page to the user comprising some or all of the information regarding the status of the contact.

This aspect of the invention provides users with enhanced information regarding the progress of their contacts. By interfacing the normal contact centre systems and a web server which is accessible to all users having a web connection, the possibility is provided to give the users better information and this leads to greater user satisfaction, and allows users to decide what action to take (continue holding or hang up, for example).

Preferably, the web page returned in step e) includes one or more user controls which when activated by the user cause the web server to issue a command to a management system of the contact centre to influence the status of the contact.

The method can further include the steps of:

f) awaiting activation of one of the one of more user controls, g) issuing the command, and h) upon receipt of a confirmation of the execution of the command, generating a new web page with information on the updated status of the contact.

A computer program product comprising a computer readable medium encoded with instructions in machine readable form is also provided to implement this method in a web server.

The invention also provides a web server having:
a) code for a first web page accessible by a user of the contact centre to enable the user to identify a contact within the contact centre to the web server,
b) an interface with a management system of a contact centre,
c) a request forwarding module for receiving from the user an identifier of the contact and forwarding the identifier to the management system of the contact centre, and
d) a web page building engine for receiving information relating to the status of a contact within the contact centre associated with a user of the contact centre, and generating a web page including the information.

The code for the first web page can be fixed code maintained in a store (e.g. a fixed HTML page stored on the server), or it can be code for the dynamic generation of the first web page on receipt of a web page request from the user.

The invention also encompasses a contact centre system comprising an interface for enabling a communications session to be initiated between a user and the contact centre, a management system for managing a contact generated in response to the initiation of the communications session, and a web server as aforesaid.

In a further aspect the invention provides a method of providing information regarding a contact within a contact centre. This method includes the steps of:
a) receiving notification of a new communication between the contact centre and a user of the contact centre,
b) generating a contact associated with the communication and allocating an identifier to the contact,
c) providing the identifier to the user,
d) receiving from a web server a contact status request for the contact, wherein the contact is identified in the contact status request using the identifier, and
e) returning to the web server, in response to the request, information regarding the current status of the contact associated with the identifier, whereby the user can submit the identifier received on initiation of the communication to a web server and receive from the web server information regarding the status of the contact.

This method of the invention includes a process which runs within the contact centre management systems as opposed to on the web server. It provides a new way of enabling a contact centre to share information with its users or customers and thereby increases customer satisfaction. It can also be combined with user control methods, as will be seen, to enable a new route whereby contacts can be controlled by the user.

Preferably, the method also includes the steps of:
f) receiving from the web server a command to effect a change in the status of the contact, and
g) in response to the command, changing the status of the contact.

The method may include a further step of:
h) issuing to the web server a confirmation of the execution of the command.

The invention also embraces a computer program for implementing this method in a computing system of a contact centre The invention also provides a contact centre management system comprising:
a) a contact object generator for generating a contact, upon receiving notification of a new communication between the contact centre and a user of the contact centre, the contact being associated with the communication,
b) an identifier allocation module for allocating an identifier to the contact,
c) an interface with a communications system of the contact centre for returning the identifier to the user, in response to the communication, and
d) an interface with a web server for receiving from the web server a contact status request for the contact, wherein the contact is identified in the contact status request using the identifier, and
e) a status information compiler for compiling, in response to the contact status request, information regarding the current status of the contact associated with the identifier and returning the information to the web server.

In a further aspect the invention provides a method of controlling a contact within a contact centre. This method includes the steps of:
a) providing a contact identifier to a user associated with the contact,
b) receiving from a web server a contact control command, the contact control command comprising the identifier and an indication of an action to be taken to alter the status of the contact, and
c) altering the status of the contact in response to the contact control command.

whereby the user can issue a command to control the contact via a web server using the identifier received on initiation of the contact.

The method may also include the step of:
d) issuing to the web server a confirmation of the execution of the command.

A computer program product comprising a computer readable medium encoded with instructions in machine readable form is also provided by the invention for executing this method in a computing system of a contact centre.

The invention also provides a contact centre management system comprising:
a) a contact identifier generator for generating an identifier for a contact being processed in the contact centre and providing the identifier to a user associated with the contact,
b) an interface for a web server for receiving from the web server a contact control command, the contact control command comprising the identifier and an indication of an action to be taken to alter the status of the contact, and
c) a command interpretation engine for altering the status of the contact in response to the contact control command.

DETAILED DESCRIPTION OF PREFERRED EMBODIMENTS

Figure 1:
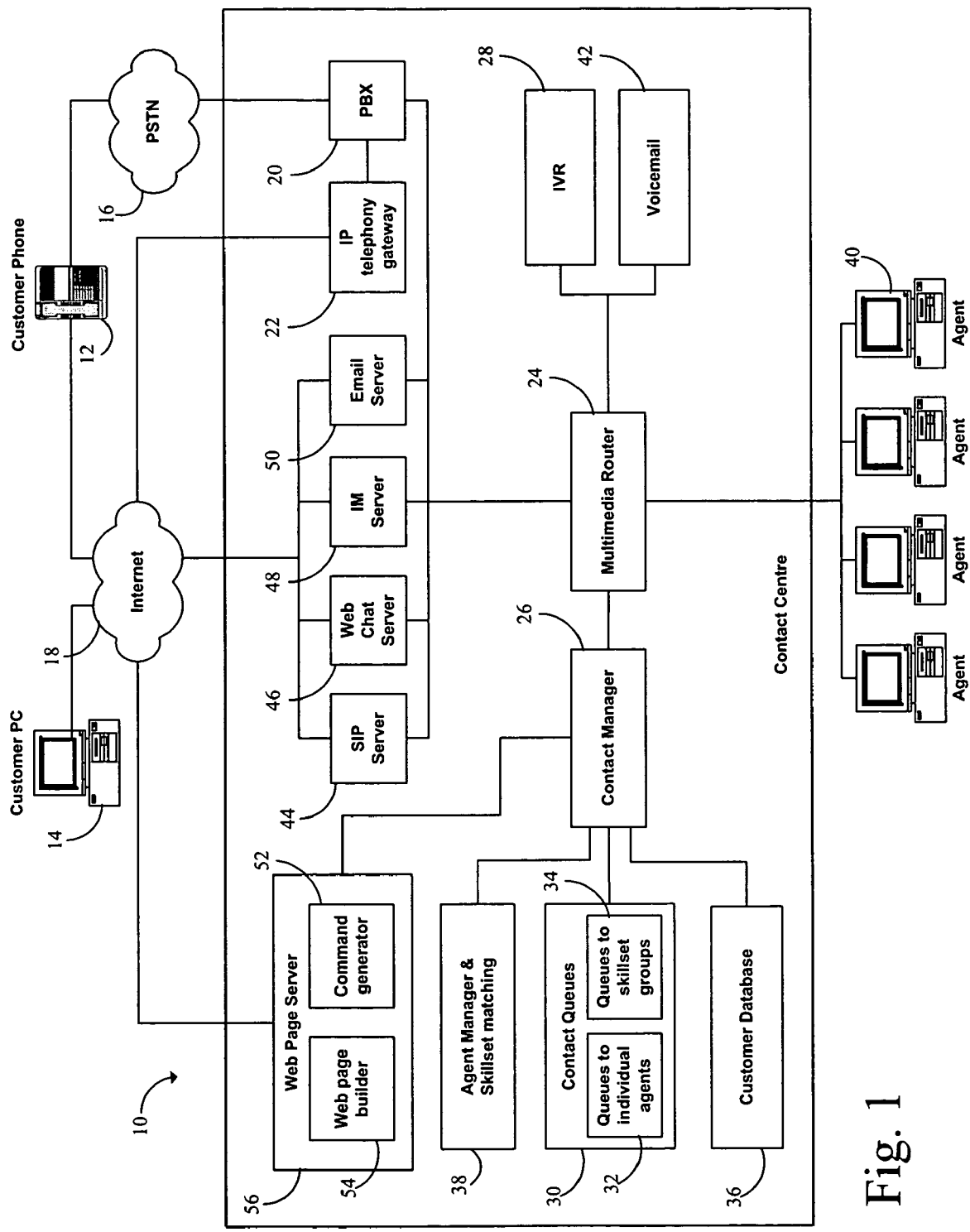
FIG. 1 is a block diagram of a contact centre according to the invention which provides information and user control over a contact.

FIG. 1 shows a schematic architecture of a contact centre implementing a method of providing remote control of a contact by a user or customer. The customer can access the contact centre 10 from a telephone 12 or a PC 14. In the case of telephone calls, the customer can either use the telephone 12 or can use a softphone application running on the PC 14 to access the contact centre. The phone 12 can connect with a private branch exchange (PBX) 20 via the public switched telephone network (PSTN) 16 or via the Internet 18 and an IP telephony gateway 22 (assuming that the phone is enabled to connect over the Internet). Similarly, a softphone application running on the PC can connect via the Internet 18 and the IP telephony gateway 22 to the PBX 20. When a new call is received at the PBX 20, it is routed to a multimedia router 24 which notifies a contact manager application 26 of the existence of a new call.

The contact manager 26 will assign an identification number to the contact and will typically then instruct the multimedia router to route the call to an interactive voice response system 28 which is used to elicit user responses from the customer to more accurately assist in queuing the contact. The responses from the IVR system 28 are sent to the contact manager which then places a token representing the contact in one or more queues 30. The queues can be individual agent queues 32 or queues to groups of agents having common skillets 34.

The queuing decisions can be assisted with reference to a customer database 36 such that, for example, a call from a customer, who is recognised in the database to be a high priority customer, can be assigned a higher priority and thereby placed higher in the queue, or can be assigned to a specialised agent or group of agents.

The contact manager 26 also interacts with an agent manager 38 which manages the resources available in the contact centre 10 and matches the skillsets of the agents 40 to the waiting contacts. In known manner, when the call reaches the top of the queue, it is assigned to a particular agent 40 who is then expected to deal with the customer query. The customer may have the option at any time, while waiting for an agent to become free, to enter a key press or combination of key presses and have the call diverted to voicemail 42 before hanging up.

In similar known manner, contacts of other media types can be received at the contact centre. Accordingly, a range of servers such as a session initiation protocol (SIP) server 44, a web chat server 46, an instant messaging (IM) server 48 and an email server 50 can all receive contacts of different respective types. These communications are all directed to the multimedia router which informs the contact manager 26. The contact manager 26 generates a new contact ID for each new contact, and these contacts are then queued and assigned to agents. Again, the details of such contact handling routines are well known in the operation of contact centres. Different contact centre systems may handle contacts in different ways to the system described above, and the invention is equally applicable to any contact handling system.

In addition to the standard features of a contact centre as described above, however, the contact centre 10 is also provided with a web page server 52 having an interface with the contact manager 26. This web page server 52 is provided with a web page building engine 54 (which uses Java Server Pages (JSP) or other suitable types of web pages) and a command generator 56 ("Java" is a Trade Mark of Sun MicroSystems). As will now be described, the web page server 52 provides customers with an additional means for tracking the progress of the contact within the contact centre and of choosing options to control or influence the contact by submitting commands to the contact centre using the command generator 56 integral to the web server 52. This process will now be described in more detail with reference to FIGS. 2-5.

Figure 2:
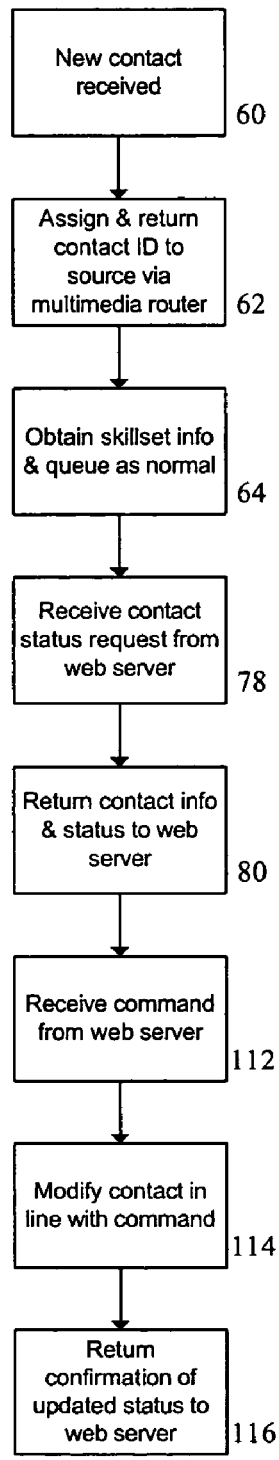
FIG. 2 is a flowchart of a process running in the contact manager of the contact centre of FIG. 1.

Referring first to FIG. 2, when a new contact is received, step 60, the contact manager assigns and returns a contact ID to the customer via the multimedia router, step 62. This can be done, for example, by generating a message from recorded elements, in which the ID number is played to the customer over the telephone or video link, or by returning a web chat response, instant messaging response or return email, for example, including the contact identifier.

As previously described, skillset information is derived from the contact in known manner and the contact is queued in an appropriate one of the contact queues 30, step 64.

When the customer is provided with the contact ID, he or she is also informed, using a standard message, of the possibility of tracking and controlling the contact via a web page whose address or URL is also provided to the customer. This address is an Internet address of the web pager server 52. The user can thus access the web page to request information regarding the contact.

Figure 3:
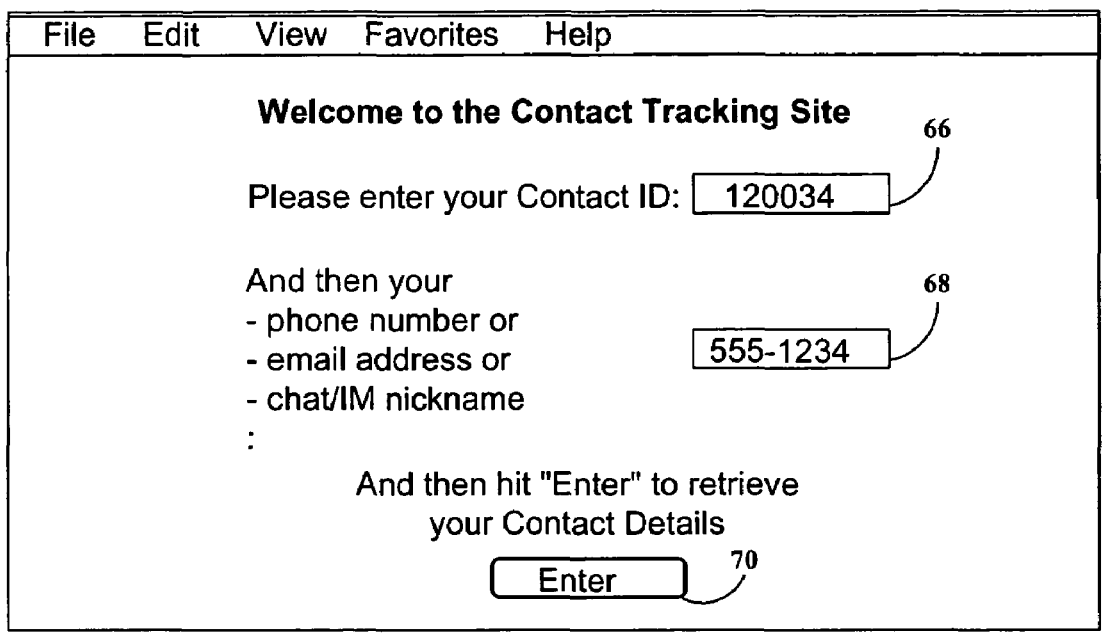
FIG. 3 is an example of a first web page served by the web page server of the contact centre of FIG. 1.

An example of such a web page is given in FIG. 3. It can be seen that a user editable field 66 is provided for the user to enter the contact ID which was generated by the contact manager 26 in step 62. One or more additional fields 68 can be provided to verify the identity of the user, such as by entering a telephone number, email address or assigned nickname for the chat or instant messaging session. Additional security measures such as a password or a unique customer ID may also be requested to assist in verification, as appropriate. When the user has entered the required information in fields 66 and 68, he or she clicks a "button" which submits the details in this page to the web server 52. Such web page functionality, allowing form submission by a user, is of course well known standard web technology.

Figure 4:
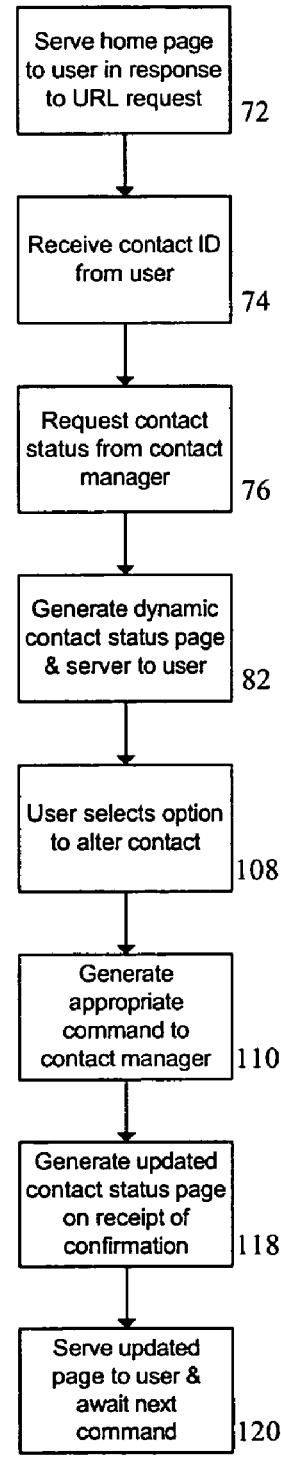
FIG. 4 is a flowchart of a process running in the web page server of the contact centre of FIG. 1.

Referring now to FIG. 4, which shows the process running on the web page server 52, the server provides the page shown in FIG. 3 when the user accesses the URL given with the contact identifier, as indicated in step 72. By submitting the details requested in the form of FIG. 3, the user provides the web server with the contact ID of the user's contact, step 74.

The web page server is programmed to interpret the submission of this form as an instruction to request information on the status of the identified contact from the contact manager, step 76. Referring back to the process running in the contact manager (FIG. 2), the contact manager receives this request, step 78 and returns information regarding the status of the identified contact in a predefined format to the web server, step 80. This contact information can include any or all of the information available to the contact manager, such as the expected wait time, the current position in queue, an identification of the skillset(s) to which the contact is queued, customer details from the database, and an indication of the agent(s) or skillset(s) to which the contact is queued.

Referring back to FIG. 4, when the web page server receives the information returned in step 80, it uses the web page engine to dynamically generate a contact status page and this is served to the user in step 82 of FIG. 4. From the point of view of the user, submission of the form in FIG. 3 (i.e. pressing "enter" button 70) results in the dynamically generated contact status page being called up in the user's browser.

Figure 5:
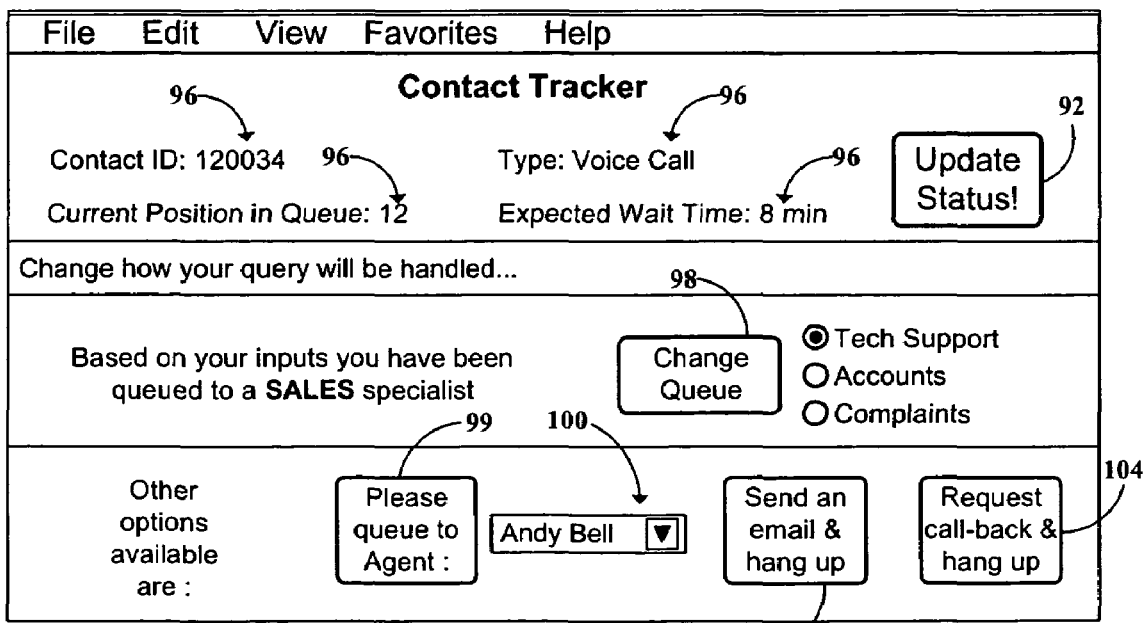
FIG. 5 is an example of a second web page served by the web page server of the contact centre of FIG. 1.

FIG. 5 shows an example of such a dynamically generated page, which includes the contact ID 84, the current position in queue 86, the media type 88 of the contact, the current expected wait time 90 and an option button 92 to update the status. This "update status" button 92 effectively acts as a refresh button causing the web page server and contact manager to repeat the process of steps 74,76,78,80 and 82, providing the user with a real time update of the page of FIG. 5.

The user is also given an indication of the skillset 94 in which the contact is queued (in this case it is the "sales" skillset). A further option 96,98 is given to the user to change the queue to which the contact has been assigned. Accordingly, the user can select from the "radio button" alternatives 96 and then submit the selected choice using a "change queue" button 98. For example, the user in this case could request that the contact be moved from the "sales" queue to the "technical support" queue.

In addition, the user is provided with other options such as to choose a particular agent (button 99) from a dropdown list 100, to send an email and terminate the current contact (button 102), or to request a callback and terminate the current contact (button 104). Referring back to FIG. 4, if the user selects any of the options 98,99,102,104 in FIG. 5 to change how the query is being handled, step 108, the web page server 52 sends this user input to the command generator 56 which generates an appropriate command in a predefined format to the contact manager 26, step 110.

Referring back to the process in the contact manager in FIG. 2, when the contact manager receives such a command from the web server, step 112, it modifies the contact in line with the command (presuming that a valid option has been selected), step 114. Thus, if the user has chosen to queue to a different skillset or to a particular agent, then the contact manager will modify the queues as appropriate and then return confirmation of the updated contact status to the web server, step 116. The web server receives this confirmation, step 118 (FIG. 4) and then serves an updated version of the page shown on FIG. 5 to the user and awaits the next command, step 120.

If the user selects an option such as button 102, the web page server will generate (in known manner) an email submission form for the user to fill in, and when this is submitted, the command generator 56 will instruct the contact manager to enter the email in an appropriate queue and to remove the call from all other queues. The contact manager then instructs the PBX to play a message to the user on the telephone indicating that the email has been queued before terminating the call.

If the user requests a call-back, then the command generator 56 will instruct the contact manager to generate a call-back token in place of the current queued call contact, and to play an appropriate message via the PBX in the voice call. This informs the user that the call-back has been queued and that the user can now hang up. When the call-back token reaches the top of a queue, the agent to whom it is assigned will make a call to the user using either the calling line ID from the original received call or a telephone number submitted by the user via the web server if the calling line ID was not available to the contact manager.

Thus, it can be seen that the web server provides an information and control interface between the user PC 14 and the contact manager 26 enabling the status of a contact to be reported in as much detail as the contact centre management chooses, and also enabling as much control over the contact to be provided to the user as the contact centre management chooses to provide.

The invention is not limited to the embodiments described herein which can be varied or modified without departing from the spirit and scope of the claimed invention.

What is claimed is:

1. A method of providing remote control over a contact within a contact centre to a user associated with the contact, comprising the steps of:
   a) generating a first web page, said first web page including information relating to the status of the contact,
   b) providing one or more user controls accessible from said first web page,
   c) awaiting activation of at least one of said controls by the user, and
   d) on activation of one of said controls, generating a first command to a contact management component of the contact centre, said first command being effective to terminate a communications session involving the user and to await a new communication from the user to the contact centre from the first web page or a second web page linked to the first web page
   e) in response to said first command, terminating said communications session involving the user and awaiting a new communication from the user, generated from the first or second web pages, including a second command different from said first command.

2. A method as claimed in claim 1, wherein said step of generating a first web page is carried out in response to a request from a user, said request including an identifier provided to the user by the contact centre to identify said contact.

3. A method as claimed in claim 2, wherein said contact is associated with a communications session between the user and the contact centre, and wherein said identifier is provided to the user as part of said communications session.

4. A method as claimed in claim 1, wherein said information includes one or more of:
   i) an indication of a position of the contact in a queue,
   ii) an indication of the current expected wait time for an agent to respond to the contact,
   iii) an indication of the identity of an agent currently assigned to deal with the contact,
   iv) an indication of a skillset grouping according to which the contact is queued, and
   v) an indication of the media type of the contact.

5. A method as claimed in claim 1, wherein said contact is associated with a real time communications session between the user and the contact centre, and the new communication is an email or form submission generated by the user from the first web page or the second web page linked to the first web page.

6. A method as claimed in claim 5, wherein said contact is associated with a communications session between the user and the contact centre selected from a voice telephony session, a video telephony session, a web chat session and an instant messaging session.

7. A method as claimed in claim 1, wherein said contact is associated with a real time communications session between the user and the contact centre, and the new communication is a call-back request generated by the user from the first web page or a the second page linked to the first web page.

8. A method as claimed in claim 7, wherein said contact is associated with a communications session between the user and the contact centre selected from a voice telephony session, a video telephony session, a web chat session and an instant messaging session.

9. A method as claimed in claim 1, further comprising the steps of:
   e) receiving from the contact centre confirmation of the new status of the contact after execution of said first command, and
   f) generating a new web page including information relating to the new status of the contact.

10. A computer program product comprising a computer-readable medium encoded with instructions in machine readable form which, when executed in a web server having an interface with a contact centre, cause the web server to:

a) generate a first web page, said first web page including information relating to the status of a contact within the contact centre associated with a user of the contact centre,
b) provide one or more user controls accessible from said first web page,
c) await activation of at least one of said controls by the user,
d) on activation of one of said controls, generate a first command to a contact management component of the contact centre, said first command being effective to terminate a communications session involving the user, and
e) await activation of a control from said first web page or a second web page linked to the first web page before providing a new communication to the contact centre from the user, said new communication including a second command different from said first command.

11. A web server comprising:
a) an interface with a management system of a contact centre,
b) a web page building engine for receiving information relating to the status of a contact within the contact centre associated with a user of the contact centre, and generating a first web page including said information,
c) a control interface for recognising the activation of one or more user controls accessible from said first web page, and
d) a command generator for generating a first command to a management system of the contact centre on activation of one of said one or more user controls, said first command being effective to terminate a communications session involving the user
wherein said control interface is arranged to await activation of a control from said first web page or a second web page linked to the first web page before providing a new communication to the contact centre from the user, said new communication including a second command different from said first command.

12. A contact centre system comprising an interface for enabling a communications session to be initiated between a user and the contact centre, a management system for managing a contact generated in response to the initiation of said communications session, and a web server, said web server comprising:
a) an interface with a management system of a contact centre,
b) a web page building engine for receiving information relating to the status of a contact within the contact centre associated with a user of the contact centre, and generating a first web page including said information,
c) a control interface for recognising the activation of one or more user controls accessible from said first web page, and
d) a command generator for generating a first command to a management system of the contact centre on activation of one of said one or more user controls, said first command being effective to terminate a communications session involving the user
wherein said control interface is arranged to await activation of a control from said first web page or a second web page linked to the first web page before providing a new communication to the contact centre from the user, said new communication including a second command different from said first command.

13. A computer program product comprising a computer-readable medium encoded with instructions in machine readable form which, when executed in a web server having an interface with a contact centre, cause the web server to:
a) provide a first web page accessible by a user of the contact centre to enable the user to identify a contact within the contact centre to said web server,
b) receive at the web server a communication from the user identifying said contact,
c) forward information identifying said contact in an information request to a management system of the contact centre,
d) receive from the management system of the contact centre information regarding the status of the contact,
e) return a second web page to the user comprising some or all of said information regarding the status of the contact, wherein said returned second web page includes one or more user controls which when activated by the user cause the web server to issue a command to a management system of the contact centre to influence the status of the contact,
f) await activation of one of said one of more user controls,
g) issue said command upon said activation, and
f) upon receipt of a confirmation of the execution of said command, generate a new web page with information on the updated status of the contact.

14. A web server comprising:
a) code for a first web page accessible by a user of a contact centre to enable the user to identify a contact within the contact centre to said web server,
b) an interface with a management system of said contact centre,
c) a request forwarding module for receiving from the user an identifier of said contact and forwarding said identifier to the management system of the contact centre, and
d) a web page building engine for receiving information relating to the status of said contact within the contact centre associated with said user of the contact centre, and generating a second web page including said information, wherein said returned second web page includes one or more user controls which when activated by the user cause the web server to issue a command to a management system of the contact centre to influence the status of the contact, said web page building engine further being configured, upon receipt of a confirmation of the execution of said command, to generate a new web page with information on the updated status of the contact, and
e) an interface for issuing said command upon activation of one of said one of more user controls, and for receiving said confirmation of the execution of said command.

15. A web server as claimed in claim 14, wherein said code for said first web page is fixed code maintained in a store.

16. A web server as claimed in claim 14, wherein said code for said first web page is code for the dynamic generation of said first web page on receipt of a web page request from the user.

17. A contact centre system comprising an interface for enabling a communications session to be initiated between a user and a contact centre, a management system for managing a contact generated in response to the initiation of said communications session, and a web server, said web server comprising:
a) code for a first web page accessible by a user of the contact centre to enable the user to identify a contact within the contact centre to said web server,
b) an interface with a management system of a contact centre, c) a request forwarding module for receiving from the user an identifier of said contact and forwarding said identifier to the management system of the contact centre, and d) a web page building engine for receiving information relating to the status of a contact within the contact centre associated with a user of the contact centre, and generating a second web page including said information, wherein said returned second web page includes one or more user controls which when activated by the user cause the web server to issue a command to a management system of the contact centre to influence the status of the contact, said web page building engine further being configured, upon receipt of a confirmation of the execution of said command, to generate a new web page with information on the updated status of the contact, and e) an interface for issuing said command upon activation of one of said one of more user controls, and for receiving said confirmation of the execution of said command.

18. A method of providing information regarding a contact within a contact centre, comprising the steps of:

a) receiving notification of a new communication between the contact centre and a user of the contact centre, b) generating a contact associated with said communication and allocating an identifier to said contact, c) providing said identifier to the user, d) receiving from a web server a contact status request for said contact, wherein the contact is identified in said contact status request using said identifier, and e) returning to the web server, in response to said contact status request, information regarding the current status of the contact associated with the identifier, f) receiving from said web server a command to terminate a communications session involving the user and to substitute a new communication received from the user via the web server, g) terminating said session in response to said command;

h) awaiting a new communication from said user submitted via said web server whereby said user can submit the identifier received on initiation of the communication to a web server, receive from the web server information regarding the status of the contact, and exercise an option to terminate the communications session and substitute a new communication via the web server.

19. A method as claimed in claim 18, wherein said information includes one or more of:

i) an indication of a position of the contact in a queue, ii) an indication of the current expected wait time for an agent to respond to the contact, iii) an indication of the identity of an agent currently assigned to deal with the contact, iv) an indication of a skillset grouping according to which the contact is queued, and v) an indication of the media type of the contact.

20. A method as claimed in claim 18, further comprising the step of:

g) issuing to the web server a confirmation of the execution of the command.

21. A computer program product comprising a computer-readable medium encoded with instructions in machine readable format which when executed in a computing system of a contact centre are effective to cause said system to:

a) generate a contact, upon receiving notification of a new communication between the contact centre and a user of the contact centre, said contact being associated with said communication, b) allocate an identifier to said contact, c) provide said identifier to the user, and d) return information to a web server, on receiving from the web server a contact status request for said contact, wherein the contact is identified in said contact status request using said identifier, said information comprising information regarding the current status of the contact associated with the identifier e) receive from said web server a command to terminate a communications session involving the user and to substitute a new communication received from the user via the web server, f) terminate said session in response to said command;

g) await a new communication from said user submitted via said web server.

22. A contact centre management system comprising:

a) a contact object generator for generating a contact, upon receiving notification of a new communication between the contact centre and a user of a contact centre, said contact being associated with said communication, b) an identifier allocation module for allocating an identifier to said contact, c) an interface with a communications system of the contact centre for returning said identifier to the user, in response to said communication, and d) an interface with a web server for receiving from the web server a contact status request for said contact, wherein the contact is identified in said contact status request using said identifier, and e) a status information compiler for compiling, in response to said contact status request, information regarding the current status of the contact associated with the identifier and returning said information to the web server said interface further being suitable to receive from said web server a command to terminate a communications session involving the user and to substitute a new communication received from the user via the web server, a processor programmed to terminate said session in response to said command and to await a new communication from said user submitted via said web server.

23. A method of providing remote control over a contact within a contact centre to a user associated with the contact, comprising the steps of:

a) generating a web page, said web page including information relating to the status of the contact, b) providing one or more user controls accessible from said web page, c) awaiting activation of at least one of said controls by the user, and d) on activation of one of said controls, generating a command to a contact management component of the contact centre, said command being effective to switch the contact between queues in the contact centre;

e) in response to said command, switching the contact between queues in the contact centre said webpage further being suitable to receive from said web server a command to terminate a communications session involving the user and to substitute a new communication received from the user via the web server, a processor programmed to terminate said session in response to said command and to await a new communication from said user submitted via said web server.

24. A computer program product comprising instructions in machine readable form which, when executed in a web server having an interface with a contact centre, cause the web server to:

a) generate a web page, said web page including information relating to the status of a contact within the contact centre associated with a user of the contact centre,
b) provide one or more user controls accessible from said web page,
c) await activation of at least one of said controls by the user, and
d) on activation of one of said controls, generate a command to a contact management component of the contact centre, said command being effective to switch the contact between queues in the contact centre; e) said webpage further being suitable to receive from said web server a command to terminate a communications session involving the user and to substitute a new communication received from the user via the web server, a processor programmed to terminate said session in response to said command and to await a new communication from said user submitted via said web server.

25. A contact centre system comprising an interface for enabling a communications session to be initiated between a user and the contact centre, a management system for managing a contact generated in response to the initiation of said communications session, and a web server, said web server comprising:

a) an interface with a management system of a contact centre,
b) a web page building engine for receiving information relating to the status of a contact within the contact centre associated with a user of the contact centre, and generating a web page including said information,
c) a control interface for recognising the activation of one or more user controls accessible from said web page, and
d) a command generator for generating a command to a management system of the contact centre on activation of one of said one or more user controls, said command being effective to switch the contact between queues in the contact centre; e) said webpage further being suitable to receive from said web server a command to terminate a communications session involving the user and to substitute a new communication received from the user via the web server, a processor programmed to terminate said session in response to said command and to await a new communication from said user submitted via said web server.

* * * * *